United States Patent
Radhakrishnan (10) Patent No.: US 9,734,236 B2
(45) Date of Patent: *Aug. 15, 2017

(54) LEVERAGING ENTERPRISE CONTENT

(71) Applicant: International Business Machines Corporation, Armonk, NY (US)

(72) Inventor: Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,416

(22) Filed: Jun. 8, 2016

(65) Prior Publication Data

US 2016/0283576 A1    Sep. 29, 2016

Related U.S. Application Data

(63) Continuation of application No. 14/935,851, filed on Nov. 9, 2015, now Pat. No. 9,384,263, which is a (Continued)

(51) Int. Cl.
*G06F 17/30* (2006.01)
*G06Q 10/06* (2012.01)
*G06Q 10/10* (2012.01)

(52) U.S. Cl.
CPC .. *G06F 17/30598* (2013.01); *G06F 17/30424* (2013.01); *G06F 17/30554* (2013.01); *G06F 17/30867* (2013.01); *G06Q 10/06* (2013.01); *G06Q 10/10* (2013.01); *G06F 17/30964* (2013.01); *G06F 17/30997* (2013.01)

(58) Field of Classification Search
None
See application file for complete search history.

(56) References Cited

U.S. PATENT DOCUMENTS 6,564,259 B1    5/2003   Baber et al.
6,804,674 B2   10/2004   Hsiao et al.
(Continued)

OTHER PUBLICATIONS

Amendment filed Apr. 8, 2015 in response to Office Action (Mail Date Jan. 16, 2015) for U.S. Appl. No. 13/603,534, filed Sep. 5, 2012.
(Continued)

*Primary Examiner* — Charles Adams
(74) *Attorney, Agent, or Firm* — Schmeiser, Olsen & Watts; John R. Pivnichny (57) ABSTRACT

A method and system for leveraging content is provided. The method includes receiving, data associated with a subscriber and registering the subscriber with an ECM computing system. Devices belonging to the subscriber are connected to the ECM computing system and metadata associated with content retrieved from the devices is generated. The content in the devices are classified into formal content and informal content. Multiple searches for additional content are monitored and multifaceted search results associated with the formal content and the informal content are generated and presented to the subscriber. The subscriber has an option to request informal content on additional end user devices from respective end users based on metadata presented by search results.

20 Claims, 4 Drawing Sheets

Related U.S. Application Data continuation of application No. 13/603,534, filed on Sep. 5, 2012, now Pat. No. 9,224,112.

(56) References Cited

U.S. PATENT DOCUMENTS

| | | | |
|---|---|---|---|
| 7,096,266 B2 | 8/2006 | Lewin et al. | |
| 7,617,197 B2 | 11/2009 | Stanton et al. | |
| 8,171,009 B2 | 5/2012 | Soroca | |
| 9,224,112 B2 | 12/2015 | Radhakrishnan | |
| 2002/0033844 A1 | 3/2002 | Levy et al. | |
| 2004/0254938 A1 | 12/2004 | Marcjan et al. | |
| 2008/0168048 A1* | 7/2008 | Bell | G06F 17/30864 |
| 2009/0271455 A1 | 10/2009 | Nagarajan et al. | |
| 2012/0117057 A1 | 5/2012 | Adimatyam et al. | |
| 2012/0215737 A1* | 8/2012 | Jennings | G06F 17/30557 |
| | | | 707/602 |
| 2013/0166391 A1* | 6/2013 | Blow | H04L 67/06 |
| | | | 705/14.66 |
| 2013/0246334 A1 | 9/2013 | Ahuja et al. | |
| 2014/0067880 A1* | 3/2014 | Radhakrishnan | G06Q 10/06 |
| | | | 707/821 |
| 2016/0063089 A1 | 3/2016 | Radhakrishnan | |

OTHER PUBLICATIONS

Notice of Allowance (Mail Date Aug. 3, 2015) for U.S. Appl. No. 13/603,534, filed Sep. 5, 2012.
Office Action (Mail Date Jan. 16, 2015) for U.S. Appl. No. 13/603,534, filed Sep. 5, 2012.
Smith et al.; Developments in Practice VIII: Enterprise Content Management; Apr. 29, 2003; Communications of the Association for Information Systems; vol. 11, Article 33; 15 pages.
Notice of Allowance (Mail Date Apr. 6, 2016) for U.S. Appl. No. 14/935,851, filed Nov. 9, 2015.

* cited by examiner

FIG.3

LEVERAGING ENTERPRISE CONTENT

This application is a continuation application claiming priority to Ser. No. 14/935,851 filed Nov. 9, 2015 which is a continuation application claiming priority to Ser. No. 13/603,534 filed Sep. 5, 2012 now U.S. Pat. No. 9,224,112 issued Dec. 29, 2015.

FIELD

The present invention relates to a method and associated system for leveraging enterprise content within an enterprise intranet.

BACKGROUND

Managing information within a business comprises an inaccurate process with little flexibility. Allowing users to manage the information may include a complicated process that may be time consuming and require a large amount of resources. Accordingly, there exists a need in the art to overcome at least some of the deficiencies and limitations described herein above.

SUMMARY

The present invention provides a method comprising: receiving, by an enterprise content management (ECM) computing system comprising a computer processor, data associated with a subscriber; registering, by the computer processor based on the data, the subscriber with the ECM computing system; connecting, by the computer processor, devices belonging to the subscriber to the ECM computing system via an Intranet; retrieving, by the computer processor from the devices, metadata associated with content retrieved by the subscriber via the devices; classifying, by the computer processor based on analysis of the metadata, the content into formal content and informal content, wherein the formal content comprises content that has been uploaded to a primary repository of the ECM computing system, and wherein the informal content comprises content that has not been uploaded to the primary repository of the ECM computing system; monitoring, by the computer processor, multiple searches for additional content initiated by the subscriber; generating, by the computer processor for the subscriber based on the monitoring and results of the classifying, multifaceted search results associated with the formal content and the informal content; and presenting, by the computer processor to the subscriber, the multifaceted search results.

The present invention provides a computer program product, comprising a computer readable storage device storing a computer readable program code, the computer readable program code comprising an algorithm that when executed by a computer processor of an enterprise content management (ECM) computer system implements a method, the method comprising: receiving, by the computer processor, data associated with a subscriber; registering, by the computer processor based on the data, the subscriber with the ECM computing system; connecting, by the computer processor, devices belonging to the subscriber to the ECM computing system via an Intranet; retrieving, by the computer processor from the devices, metadata associated with content retrieved by the subscriber via the devices; classifying, by the computer processor based on analysis of the metadata, the content into formal content and informal content, wherein the formal content comprises content that has been uploaded to a primary repository of the ECM computing system, and wherein the informal content comprises content that has not been uploaded to the primary repository of the ECM computing system; monitoring, by the computer processor, multiple searches for additional content initiated by the subscriber; generating, by the computer processor for the subscriber based on the monitoring and results of the classifying, multifaceted search results associated with the formal content and the informal content; and presenting, by the computer processor to the subscriber, the multifaceted search results.

The present invention provides an enterprise content management (ECM) computer system comprising a computer processor coupled to a computer-readable memory unit, the memory unit comprising instructions that when executed by the computer processor implements a method comprising: receiving, by the computer processor, data associated with a subscriber; registering, by the computer processor based on the data, the subscriber with the ECM computing system; connecting, by the computer processor, devices belonging to the subscriber to the ECM computing system via an Intranet; retrieving, by the computer processor from the devices, metadata associated with content retrieved by the subscriber via the devices; classifying, by the computer processor based on analysis of the metadata, the content into formal content and informal content, wherein the formal content comprises content that has been uploaded to a primary repository of the ECM computing system, and wherein the informal content comprises content that has not been uploaded to the primary repository of the ECM computing system; monitoring, by the computer processor, multiple searches for additional content initiated by the subscriber; generating, by the computer processor for the subscriber based on the monitoring and results of the classifying, multifaceted search results associated with the formal content and the informal content; and presenting, by the computer processor to the subscriber, the multifaceted search results.

The present invention advantageously provides a simple method and associated system capable of managing information within a business.

BRIEF DESCRIPTION OF THE DRAWINGS

FIG. 1, including FIG. 1A and FIG. 1B, illustrates a system for leveraging enterprise content within an enterprise intranet, in accordance with embodiments of the present invention

DETAILED DESCRIPTION

Figures 1, 1A:
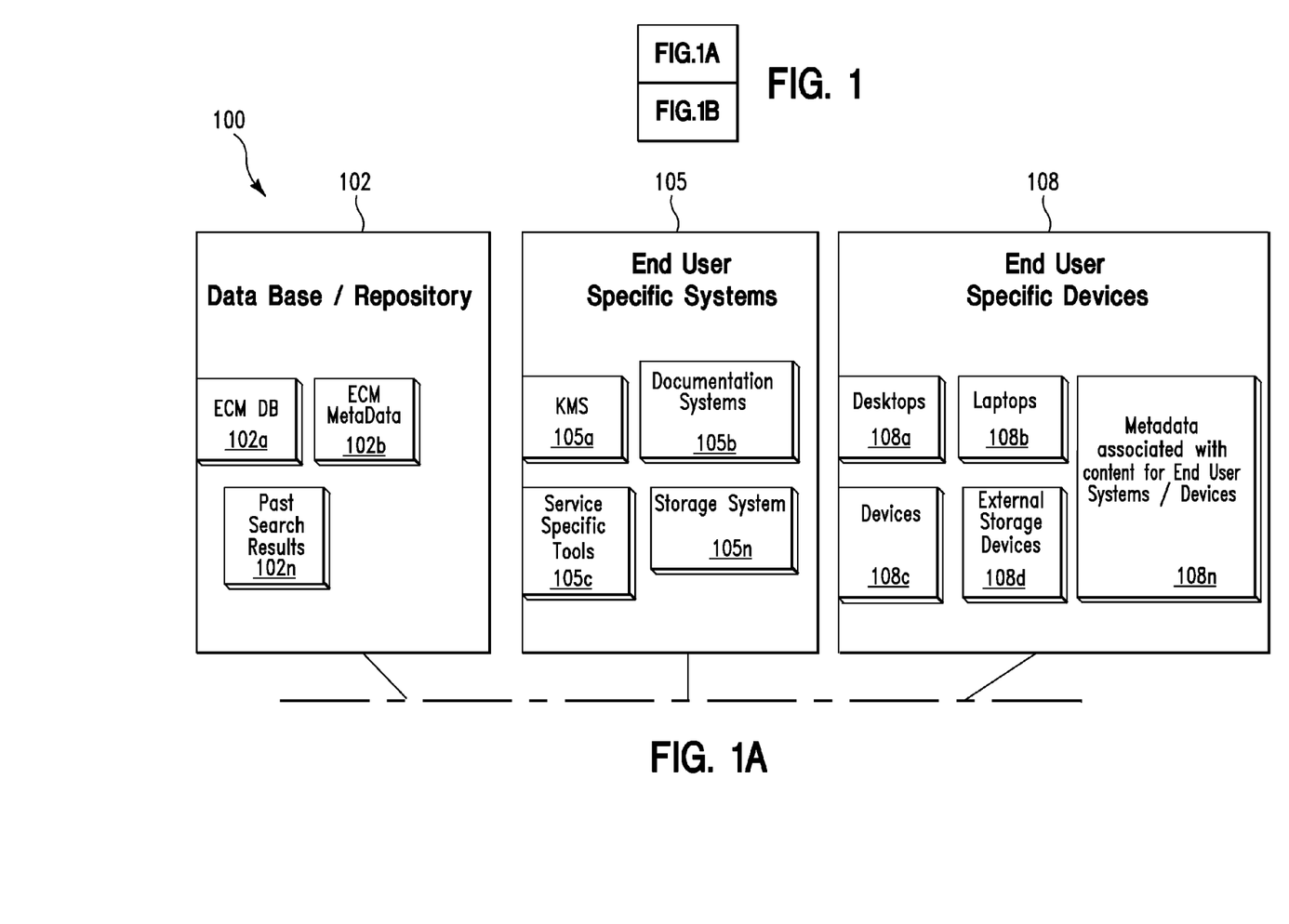
Figure 1B:
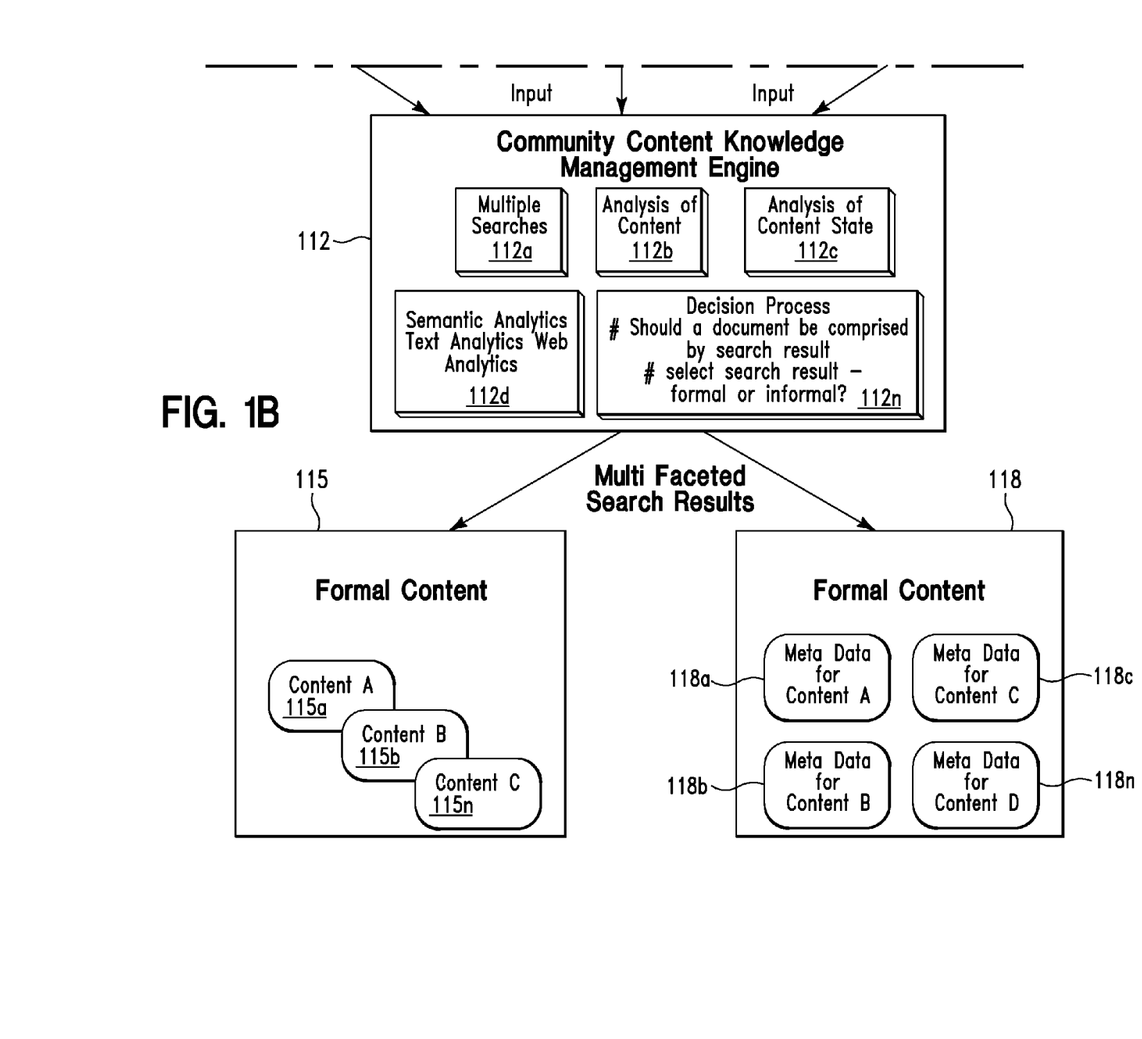

FIG. 1, including FIG. 1A and FIG. 1B, illustrates a system 100 for leveraging enterprise content within an enterprise intranet, in accordance with embodiments of the present invention. System 100 comprises a database/repository 102, end user specific systems 105, and end user specific devices 108 applying input to a (community content/knowledge) management engine 112. Management engine 112 generates multifaceted search results from content of database/repository 102, end user specific systems 105, and end user specific devices 108. The multifaceted search results include formal content 115 and informal content 118. Formal content may include, inter alia, content 115a, content 115b, and content 115n. Informal content may include, inter alia, metadata 118a for content 115a, metadata 118b for content 115b, metadata 118c for content 115n, and metadata 118n for content D. Management engine 112 enables the following processes: multiple searches 112a, analysis of content 112b, analysis of content state 112c, semantic analytics/text analytics,/Web analytics 112d, and a decision process (e.g., should a document be comprised by a search result, select search result from formal or informal, etc). Database/repository 102 may include, inter alia, an enterprise content management (ECM) database 102a, ECM metadata 102b, past search results 102n. End user specific systems 105 may include, inter alia, a key management service (KMS) 105a, documentation systems 105b, service specific tools 105c, and storage systems 105n. End user specific devices 108 may include, inter alia, desktops 108a, laptops 108b, devices 108c, external storage devices 108d, and metadata 108n.

System 100 enables a method, data model and mechanism allowing a search for formal content and informal content using, inter alia, keywords, titles, author names, etc to search for content within an ECM system and systems within an extended enterprise intranet subscribing to a search and find content service. Formal content is defined herein as content that has been uploaded to a primary repository of an ECM computing system. Informal content is defined herein as content that has not been uploaded to the primary repository of the ECM computing system.

System 100 enables the following process for leveraging enterprise content within an enterprise intranet:
1. Each end user or system administrator subscribes to an Intranet ECM service and allows for the Intranet ECM service to connect to his/her system or device (agent based or agent less).
2. The Intranet ECM service collects/stores metadata (from connected systems and devices on in a primary ECM repository) associated with content from each system or device using a set of algorithms. The metadata may include, inter alia, a document type, a title, a created/updated last date, an author, top ten key words, top ten key technical words, etc.
3. Each time an end user logs into the Intranet ECM service and searches for specific content using key words, etc, the Intranet ECM service generates two search results:
   a. A search of formal content that has been cleaned, processed, and uploaded to the primary ECM repository.
   b. A search of informal content that has not been cleaned, processed, and uploaded to the primary ECM repository but exists on systems/devices that have subscribed to the ECM service and have been connected to the primary ECM repository/database/system via a secure enterprise intranet.
4. The end user downloads relevant formal content from the ECM repository.
5. The end user generates a request for relevant informal content from contact names presented by a second search result.
6. Based on a frequency of the informal content being presented in the search result, an ECM administrator may contact content owners to formally share their content via the ECM system.

The following scenarios illustrate implementation examples for leveraging enterprise content within an enterprise intranet:

EXAMPLE 1

An employee A of enterprise XYZ is a leading researcher in the field of "role based intelligence" and has published papers and presentations at multiple internal and external conferences in the field of "role based intelligence". Employee A has uploaded his papers and presentations into an enterprise content management tool. Additionally, employee A has subscribed his systems and devices (e.g., two laptops and three external storage devices) to an ECM service thereby allowing additional employees to research his current work or reuse his work products.

An employee L has recently started working on a related topic applying "role based intelligence" and role based intelligence models for his process domains. Employee L has enabled a search for materials on the topic via an intranet ECM tool resulting in:
A. A list of formal content uploaded by employee A (and additional employees) that is related to his search criteria.
B. A list of informal content developed or being developed by employee A along with contact information for employee A.

Employee L contacts employee A and schedules a teleconference to discuss his current work and work products thereby allowing employee L to reuse his current work and work products that published via the ECM.

EXAMPLE 2

Employee D is researching the field of nano-technology (i.e., for two decades). In the past year, a company employing employee D has developed a new business strategy to develop products based on nano-science and nano-technology thereby generating several searches associated with nano-science, nano-technology, nano-tubes, etc within an ECM repository. An ECM administrator notices that several of these searches results in a search list that refers to content in systems/devices belonging to employee D. Therefore, the ECM administrator contacts employee D and arranges to formalize and publish the content via the enterprise ECM system.

Figure 2:
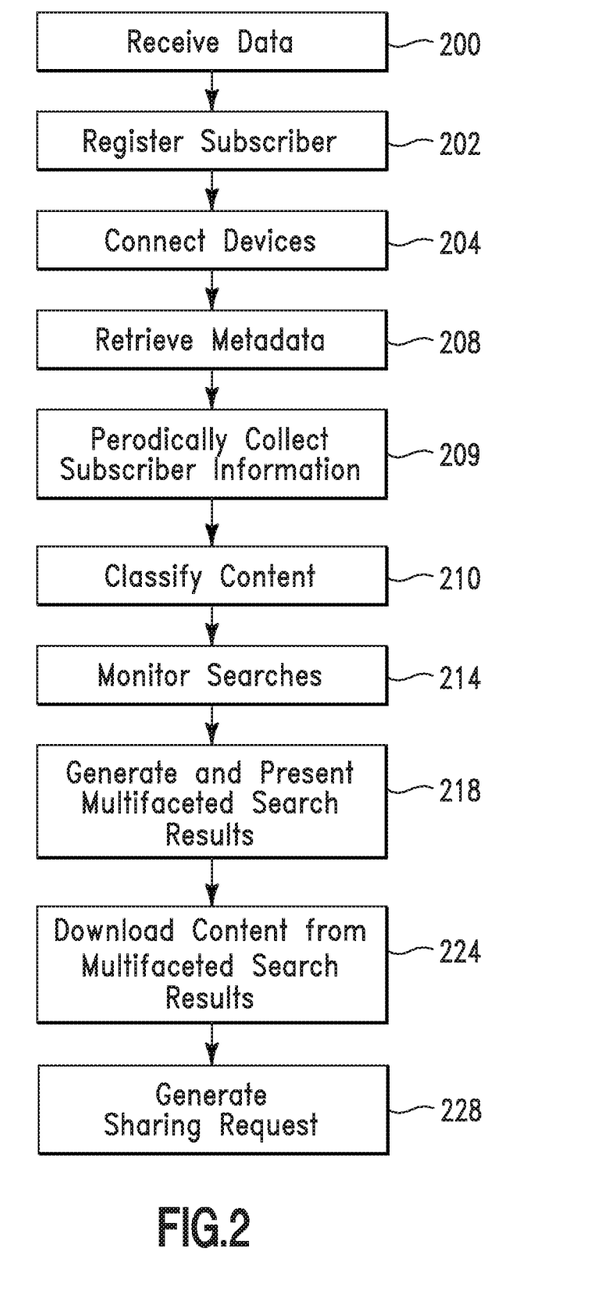
FIG. 2 illustrates an algorithm detailing a process flow enabled by the system of FIG. 1, in accordance with embodiments of the present invention.

FIG. 2 illustrates an algorithm detailing a process flow enabled by system 100 of FIG. 1 for leveraging enterprise content within an enterprise intranet2, in accordance with embodiments of the present invention. Each of the steps in the algorithm of FIG. 5 may be enabled and executed by a computer processor executing computer code. In step 200, an enterprise content management (ECM) computing system (comprising a computer processor) receives data associated with a subscriber. The data may include, inter alia, basic registration information, end user HR and profile data, end user identity data, end user work place data, etc. In step 202, the subscriber is registered (based on the data) with the ECM computing system. The subscriber may be registered voluntarily or as a requirement of a company policy. In step 204 devices belonging to the subscriber are connected to the ECM computing system via an (ECM) Intranet. In step 208, metadata associated with content retrieved by the subscriber via the devices is periodically retrieved from the devices. The metadata may include, inter alia, information associated with document types of the content, titles of the content, dates created/updated for the content, authors of the content, keywords of the content, etc. In step 209, subscriber data (implicit information from subscriber systems and peripheral devices) is periodically retrieved. In step 210, the content is classified (based on analysis of the metadata) into formal content and informal content. The formal content comprises content (published or unpublished) that has been uploaded to a primary repository of the ECM computing system. The informal content comprises content that has not been uploaded to the primary repository of the ECM computing system. The analysis of the metadata may include text analytics, Web analytics, metadata analysis such as a date created/modified, a frequency of modifications by time periods, number of shares via emails, etc. In step 214, multiple searches for additional content initiated by the subscriber are monitored. In step 218, multifaceted search results associated with the formal content and the informal content are generated (based on results of steps 210 and 214) and presented to the subscriber. The multifaceted search results comprise search results associated with the formal content and search results associated with the informal content. The formal content may include published or non-published content uploaded to an ECM repository. In step 224, relevant formal content from the primary repository is downloaded in accordance with the multifaceted search results. Additionally, relevant informal content from contact devices belonging to users associated with the subscriber is downloaded in accordance with the multifaceted search results. In step 228, a request for formally sharing a portion of the informal content with the ECM computing system is generated based on a frequency of a portion of the informal content being presented by the multifaceted search results and additional search results. The request is transmitted to owners of the portion of the informal content, said request.

Figure 3:
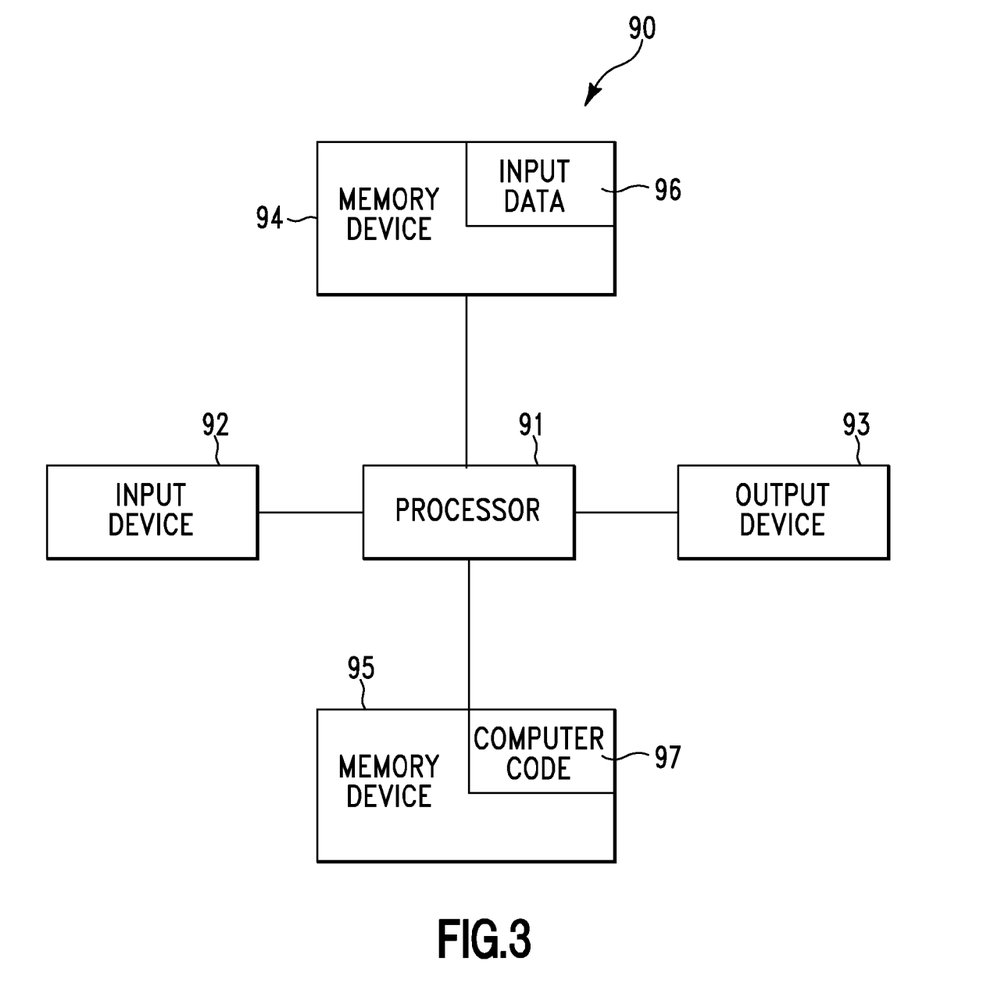
FIG. 3 illustrates a computer apparatus used by the system of FIG. 1 for leveraging enterprise content within an enterprise intranet, in accordance with embodiments of the present invention.

FIG. 3 illustrates a computer apparatus 90 used by system 2 of FIG. 1 for leveraging enterprise content within an enterprise intranet, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for leveraging enterprise content within an enterprise intranet. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to leverage enterprise content within an enterprise intranet. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for leveraging enterprise content within an enterprise intranet. In another embodiment, the invention provides a business method that performs the process steps of the invention on a subscription, advertising, and/or fee basis. That is, a service supplier, such as a Solution Integrator, could offer to leverage enterprise content within an enterprise intranet. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   connecting, by an enterprise content management (ECM) computing system comprising a computer processor, devices belonging to a subscriber to said ECM computing system via an Intranet, wherein said devices comprise computing devices and storage devices;
   connecting, by said computer processor, end user systems associated with said subscriber to said ECM computing system via said Intranet, wherein said end user systems comprise service tools, documentation systems, and storage systems;
   connecting, by said computer processor, database and repository systems associated with said subscriber to said ECM computing system via said Intranet, wherein said database and repository systems comprise a database, an enterprise content management metadata system, and past search results;
   retrieving, by said computer processor from said devices, said end user systems, and said database and repository systems, metadata associated with content retrieved by said subscriber via said devices and said end user systems;
   analyzing, by said computer processor, said metadata retrieved from said devices, said end user systems, and said database and repository systems, wherein said metadata is associated with content retrieved by said subscriber via said devices and said end user systems, and wherein said analyzing comprises: executing a text analytics process with respect to said metadata;
   executing a Web analytics process with respect to said metadata; and performing an analysis of said metadata with respect to dates of creation and modification of said content, a frequency of said modification being performed with respect to time periods, and numbers of shares of said content via emails;

classifying, by said computer processor based on said analyzing said metadata, said content into formal content and informal content, wherein said formal content comprises content that has been uploaded to a primary repository of said ECM computing system, and wherein said informal content comprises content that has not been uploaded to said primary repository of said ECM computing system;

generating, by said computer processor for said subscriber based on monitoring multiple searches for additional content initiated by said subscriber and results of said classifying, multifaceted search results associated with said formal content and said informal content; and presenting, by said computer processor to said subscriber, said multifaceted search results.

2. The method of claim 1, further comprising: downloading, by said computer processor in accordance with said multifaceted search results, relevant formal content from said primary repository.

3. The method of claim 1, further comprising: downloading, by said computer processor in accordance with said multifaceted search results, relevant informal content from contact devices belonging to users associated with said subscriber.

4. The method of claim 1, wherein said metadata comprises information associated with document types of said content, titles of said content, dates created or updated for said content, authors of said content, and keywords of said content.

5. The method of claim 1, wherein said formal content comprises published content and unpublished content.

6. The method of claim 1, wherein said multifaceted search results comprise first search results associated with said formal content and second search results associated with said informal content.

7. The method of claim 1, further comprising: generating, by said computer processor based on a frequency of a portion of said informal content being presented by said multifaceted search results and by additional search results, a request for formally sharing said portion of said informal content with said ECM computing system; and transmitting, by said computer processor to owners of said portion of said informal content, said request.

8. The method of claim 1, further comprising: providing at least one support service for at least one of creating, integrating, hosting, maintaining, and deploying computer-readable code in the computing system, said code being executed by the computer processor to implement: said receiving, said connecting said devices, said connecting said end user systems, said connecting said database, said retrieving, said analyzing, said classifying, said generating, and said presenting.

9. A computer program product, comprising a non-transitory computer readable hardware storage device storing a computer readable program code, said computer readable program code comprising an algorithm that when executed by a computer processor of an enterprise content management (ECM) computer system implements a method, said method comprising:

connecting, by said computer processor, devices belonging to a subscriber to said ECM computing system via an Intranet, wherein said devices comprise computing devices and storage devices;

connecting, by said computer processor, end user systems associated with said subscriber to said ECM computing system via said Intranet, wherein said end user systems comprise service tools, documentation systems, and storage systems;

connecting, by said computer processor, database and repository systems associated with said subscriber to said ECM computing system via said Intranet, wherein said database and repository systems comprise a database, an enterprise content management metadata system, and past search results;

retrieving, by said computer processor from said devices, said end user systems, and said database and repository systems, metadata associated with content retrieved by said subscriber via said devices and said end user systems;

analyzing, by said computer processor, said metadata retrieved from said devices, said end user systems, and said database and repository systems, wherein said metadata is associated with content retrieved by said subscriber via said devices and said end user systems, and wherein said analyzing comprises:

executing a text analytics process with respect to said metadata; executing a Web analytics process with respect to said metadata; and performing an analysis of said metadata with respect to dates of creation and modification of said content, a frequency of said modification being performed with respect to time periods, and numbers of shares of said content via emails;

classifying, by said computer processor based on said analyzing said metadata, said content into formal content and informal content, wherein said formal content comprises content that has been uploaded to a primary repository of said ECM computing system, and wherein said informal content comprises content that has not been uploaded to said primary repository of said ECM computing system;

generating, by said computer processor for said subscriber based on monitoring multiple searches for additional content initiated by said subscriber and results of said classifying, multifaceted search results associated with said formal content and said informal content; and presenting, by said computer processor to said subscriber, said multifaceted search results.

10. The computer program product of claim 9, wherein said method further comprises:

downloading, by said computer processor in accordance with said multifaceted search results, relevant formal content from said primary repository.

11. The computer program product of claim 9, wherein said method further comprises:

downloading, by said computer processor in accordance with said multifaceted search results, relevant informal content from contact devices belonging to users associated with said subscriber.

12. The computer program product of claim 9, wherein said metadata comprises information associated with document types of said content, titles of said content, dates created or updated for said content, authors of said content, and keywords of said content.

13. The computer program product of claim 9, wherein said formal content comprises published content and unpublished content.

14. The computer program product of claim 9, wherein said multifaceted search results comprise first search results associated with said formal content and second search results associated with said informal content.

15. The computer program product of claim 9, wherein said method further comprises:
generating, by said computer processor based on a frequency of a portion of said informal content being presented by said multifaceted search results and by additional search results, a request for formally sharing said portion of said informal content with said ECM computing system; and
transmitting, by said computer processor to owners of said portion of said informal content, said request.

16. An enterprise content management (ECM) computer system comprising a computer processor coupled to a computer-readable memory unit, said memory unit comprising instructions that when executed by the computer processor implements a method comprising:
connecting, by said computer processor, devices belonging to a subscriber to said ECM computing system via an Intranet, wherein said devices comprise computing devices and storage devices;
connecting, by said computer processor, end user systems associated with said subscriber to said ECM computing system via said Intranet, wherein said end user systems comprise service tools, documentation systems, and storage systems;
connecting, by said computer processor, database and repository systems associated with said subscriber to said ECM computing system via said Intranet, wherein said database and repository systems comprise a database, an enterprise content management metadata system, and past search results;
retrieving, by said computer processor from said devices, said end user systems, and said database and repository systems, metadata associated with content retrieved by said subscriber via said devices and said end user systems;
analyzing, by said computer processor, said metadata retrieved from said devices, said end user systems, and said database and repository systems, wherein said metadata is associated with content retrieved by said subscriber via said devices and said end user systems, and wherein said analyzing comprises:
executing a text analytics process with respect to said metadata;
executing a Web analytics process with respect to said metadata; and
performing an analysis of said metadata with respect to dates of creation and modification of said content, a frequency of said modification being performed with respect to time periods, and numbers of shares of said content via emails;
classifying, by said computer processor based on said analyzing said metadata, said content into formal content and informal content, wherein said formal content comprises content that has been uploaded to a primary repository of said ECM computing system, and wherein said informal content comprises content that has not been uploaded to said primary repository of said ECM computing system;
generating, by said computer processor for said subscriber based on monitoring multiple searches for additional content initiated by said subscriber and results of said classifying, multifaceted search results associated with said formal content and said informal content; and
presenting, by said computer processor to said subscriber, said multifaceted search results.

17. The ECM computer system of claim 16, wherein said method further comprises:
downloading, by said computer processor in accordance with said multifaceted search results, relevant formal content from said primary repository.

18. The ECM computer system of claim 16, wherein said method further comprises:
generating, by said computer processor, an automated request to specified end users, said automated request for sharing specified informal content with a specified subscriber associated with generating a search producing results included within said specified informal content.

19. The ECM computer system of claim 16, wherein said formal content comprises published content and unpublished content.

20. The ECM computer system of claim 16, wherein said multifaceted search results comprise first search results associated with said formal content and second search results associated with said informal content.

* * * * *